UNITED STATES PATENT OFFICE.

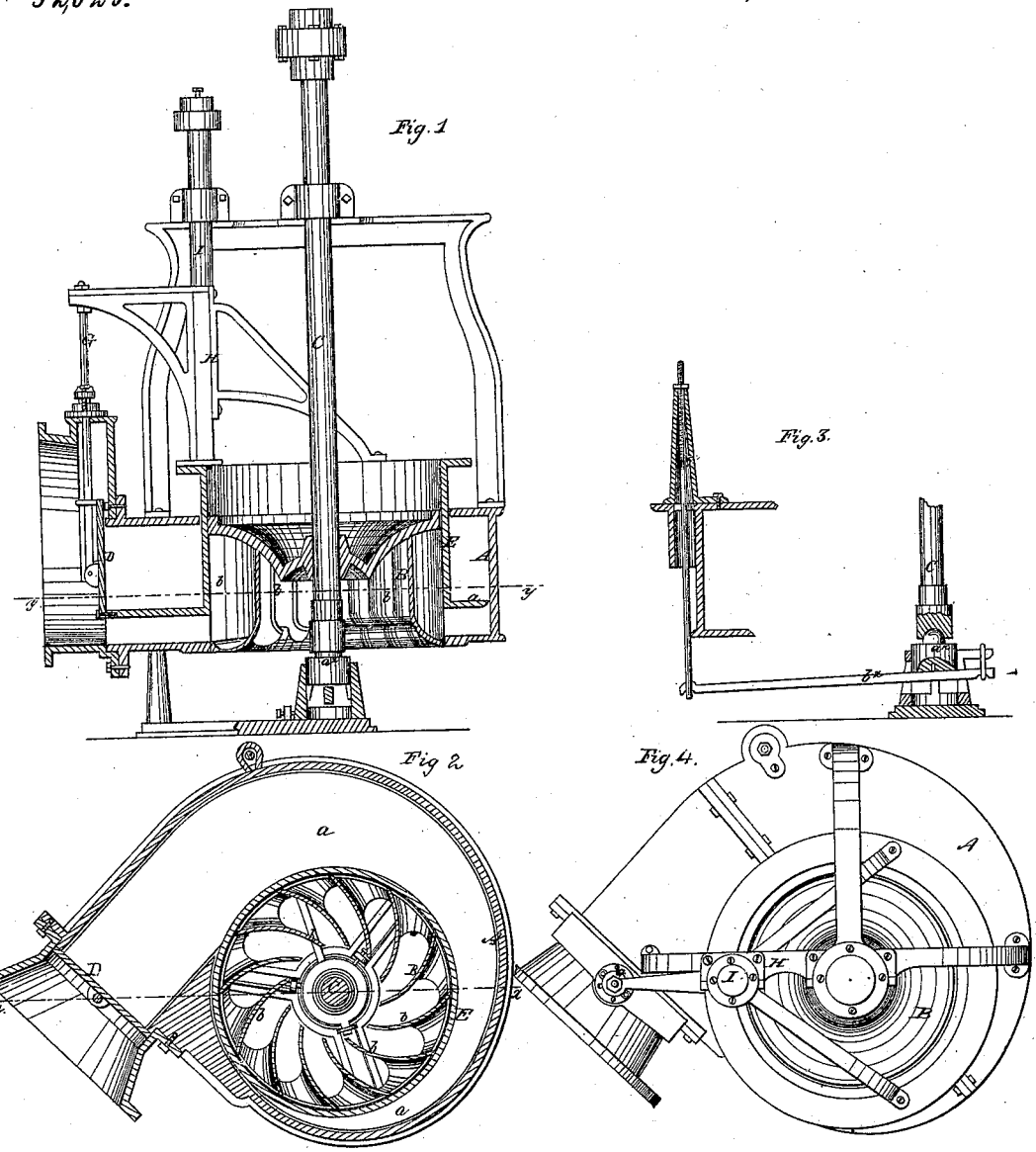

JOHN TYLER, OF WEST LEBANON, NEW HAMPSHIRE.

IMPROVEMENT IN TURBINE WATER-WHEELS.

Specification forming part of Letters Patent No. 52,625, dated February 13, 1866.

*To all whom it may concern:*

Be it known that I, JOHN TYLER, of West Lebanon, in the county of Grafton and State of New Hampshire, have invented a new and Improved Water-Wheel; and I do hereby declare that the following is a full, clear, and exact description thereof, which will enable those skilled in the art to make and use the same, reference being had to the accompanying drawings, forming part of this specification, in which—

Figure 1 is a vertical section of my invention, taken in the line $x\,x$, Fig. 2; Fig. 2, a horizontal section of the same, taken in the line $y\,y$, Fig. 1; Fig. 3, a detached side view of the step-adjusting mechanism of the wheel-shaft; Fig. 4, a plan or top view of the same.

Similar letters of reference indicate corresponding parts.

This invention relates to a new and useful improvement in water-wheels of that class which are placed on a vertical shaft and inclosed within a scroll, commonly termed "turbine wheels."

The object of the invention is to obtain a simple means for varying the capacity of the wheel according to the power required from it or to the supply of water, so that the wheel may operate and give out any amount of power less than its maximum without consuming any more than a proportionate amount of water.

It is well known to mill-wrights that a turbine water-wheel, when running under a diminished supply of water, and consequently giving out less than its maximum power, consumes or draws a proportionably greater amount of water than when giving out its full or maximum power; hence there is a great loss of water in running a wheel of this class under a variable head or under a diminished supply of water—a difficulty which is fully obviated by my improvement.

A represents the scroll of the wheel; B, the wheel; C, the wheel-shaft, and D the gate which slides vertically in the mouth of the scroll A.

The wheel B is encompassed by a cylinder, E, which is allowed to slide freely up and down, said cylinder passing through the top plate of the scroll and having a rim or flange, $a$, at its lower end which works in contact with the inner surface of the scroll, as shown clearly in Fig. 1. The edges of the buckets $b$ of the wheel just clear the inner surface of the cylinder E; and hence it will be seen that by raising and lowering the cylinder E more or less of the buckets $b$ may be exposed, as desired. The lower end of the gate D is connected by the flange $a$ with the lower end of the cylinder E, and this flange forms a horizontal partition in the scroll, as shown clearly in Figs. 1 and 2. The upper end of the gate rod or shaft G is connected to a frame, H, which is attached to the upper end of the cylinder E, and to this frame H an upright shaft, I, is attached, by moving which the cylinder E and gate D may be raised and lowered simultaneously. The wheel-step $a^\times$ may be adjusted as usual by a lever and screw, $b^\times\,c^\times$. (See Fig. 3.)

From the above description it will be seen that the capacity of the wheel may be varied as desired, and the supply of water to the wheel regulated to suit the capacity of the wheel, by a simple adjustment of the shaft I or the shaft G of the gate D as the gate D rises and falls with the cylinder E, and the scroll A, on account of the flange $a$ at the lower end of the cylinder E, is also varied in capacity to correspond with the wheel.

Having thus described my invention, I claim as new and desire to secure by Letters Patent—

1. The cylinder E, encompassing the wheel B, and provided with a rim or flange, $a$, at its lower end to fit within the scroll A, substantially as shown and described, varying simultaneously or by a single manipulation the capacity of the wheel and scroll, as set forth.

2. Connecting the gate D with the cylinder E by means of the flange $a$, and thus permitting the gate and cylinder to be moved simultaneously, and enabling the supply of water to the wheel to be commensurate with the capacity of the wheel and the scroll substantially as described.

JOHN TYLER.

Witnesses:
B. E. RICHARDSON,
DANIEL RICHARDSON.